UNITED STATES PATENT OFFICE.

JOHANNES STUBER AND JACOB STUBER, OF ASTORIA, NEW YORK.

IMPROVEMENT IN BREWING BEER.

Specification forming part of Letters Patent No. 159,716, dated February 9, 1875; application filed January 14, 1875.

*To all whom it may concern:*

Be it known that we, JOHANNES STUBER and JACOB STUBER, both of Astoria, in the county of Queens and State of New York, have invented a certain new and useful Improvement in Brewing Beer, of which the following is a specification:

This invention consists in boiling the first wort in a separate kettle, and an equal quantity of the second wort, together with the requisite quantity of hops, in another kettle, and then mixing the two liquids together in the cooling-tanks. During the fermentation glycerine is added, and the beer is fined by the addition of fresh beer, together with hops, after the latter have been boiled with the wort.

In carrying out our invention we prepare the wort by treating mash of barley or other suitable material with heated water in the usual manner. The first wort we draw off in a copper, and an equal quantity of the second wort we draw off in a second copper, and boil these liquids separately, the proper quantity of hops being added to the second wort.

By these means we are enabled to reduce the time for boiling the first wort. While the wort containing the hops has to be boiled for at least two hours, the first wort (which is heated separately and without the hops) is only boiled until it becomes clear, which requires about half an hour, and thereby the formation of unfermentable saccharine matter is prevented, and the beer is rendered durable. If the beer contains unfermentable saccharine matter, it is liable to become sour.

After the liquids have been boiled we mix them together in the cooling-tanks, and from the cooling-tanks we introduce the beer into the fermenting-tanks. During the fermentation we add to the beer a quantity of glycerine—about one-quarter pound for each barrel of beer. After the fermentation has been completed we draw off the beer into the resting-tanks, and for the purpose of fining the beer we add one or more times a quantity of fresh beer, for the purpose of renewing the fermentation and of causing the cells of the beer to ferment thoroughly, and to produce a foam which is cream-like, stiff, and durable, while, at the same time, the durability of the beer is increased. The fresh beer which we use is wort just commencing to ferment.

With the fining-beer we mix a quantity of hops, which are taken from the coppers after they have been boiled with the wort. The quantity of hops which we use for this purpose is about one and one-half pound for each barrel of beer.

By adding glycerine to the beer during the process of fermentation the durability of the beer is increased, a fine flavor is imparted to the same, and it is rendered beneficial to the health. Furthermore, the exhausted hops which we use in the process of fining our beer serve to keep off the oxygen of the air and prevent the beer from getting sour, and, while these exhausted hops are usually thrown away, we employ them for a useful purpose.

What we claim as new, and desire to secure by Letters Patent, is—

1. In the process of brewing beer, boiling the first wort in a separate kettle, and the second wort, together with the hops, in another kettle, and mixing the two liquids in about equal proportions.

2. The process of fining beer by adding to the beer while in the resting-tanks, one or more times, a quantity of fresh beer, substantially as set forth.

3. The process of fining beer by the action of a mixture of fresh beer with exhausted hops, substantially as described.

In testimony that we claim the foregoing we have hereunto set our hands and seals this 8th day of January, 1875.

JOHANNES STUBER. [L. S.]
JACOB STUBER. [L. S.]

Witnesses:
E. F. KASTENHUBER,
W. HAUFF.